April 30, 1968 G. BETHMANN 3,380,364
FILM COUNTER MECHANISM FOR PHOTOGRAPHIC CAMERAS
Filed Oct. 21, 1965 3 Sheets-Sheet 1

April 30, 1968  G. BETHMANN  3,380,364
FILM COUNTER MECHANISM FOR PHOTOGRAPHIC CAMERAS
Filed Oct. 21, 1965  3 Sheets-Sheet 2

April 30, 1968     G. BETHMANN     3,380,364
FILM COUNTER MECHANISM FOR PHOTOGRAPHIC CAMERAS
Filed Oct. 21, 1965     3 Sheets-Sheet 3

United States Patent Office 3,380,364
Patented Apr. 30, 1968

3,380,364
FILM COUNTER MECHANISM FOR
PHOTOGRAPHIC CAMERAS
Gustav Bethmann, Braunschweig, Germany, assignor to
Rollei-Werke Franke & Heidecke, Braunschweig, Germany, a firm of Germany
Filed Oct. 21, 1965, Ser. No. 500,013
Claims priority, application Germany, Nov. 4, 1964,
R 39,168
10 Claims. (Cl. 95—31)

An object of the invention is the provision of a generally improved and more satisfactorily film counter mechanism.

Another object is the provision of a simple and improved form of counter mechanism which can be used for cameras loaded either with film of normal length (e.g. 12 exposures) or with film of double length (e.g. 24 exposures), and which will, in either case, give the operator an accurate count of the film frames.

Still another object is the provision of such counter mechanism so designed that it requires only a minimum change in the design of certain existing forms of counter mechanism, with a minimum amount of new tooling and parts.

A further object is the provision of counter mechanism so designed as to extend the size or scale of the counter so that larger figures can be used for the counter numerals if the same number of frames are to be counted as heretofore, or the same size numerals heretofore used can be employed for counting a larger number of frames.

These and other desirable objects may be attained in the manner disclosed as an illustrative embodiment of the invention in the following description and in the accompanying drawings forming a part hereof, in which.

The invention is especially intended for cameras of the type which automatically meter the advance of the film, without special attention on the part of the operator to observe a number or other indication on the film through a window in the camera body, but certain features of the invention are useful in cameras of other types also. A typical camera of the automatic film metering type, for which the present invention is particularly useful, is the well known "Rolleiflex" camera. For the sake of brevity, the following description of the invention assumes that the reader is already familiar with such cameras, and particularly with the references mentioned in Weiss Patent 2,926,424, granted Mar. 1, 1960, at column 2, lines 14–28 and lines 43–50 and especially familiar with the basic structure disclosed in Müller Patent 2,148,636, dated Feb. 28, 1939.

Figure 1:
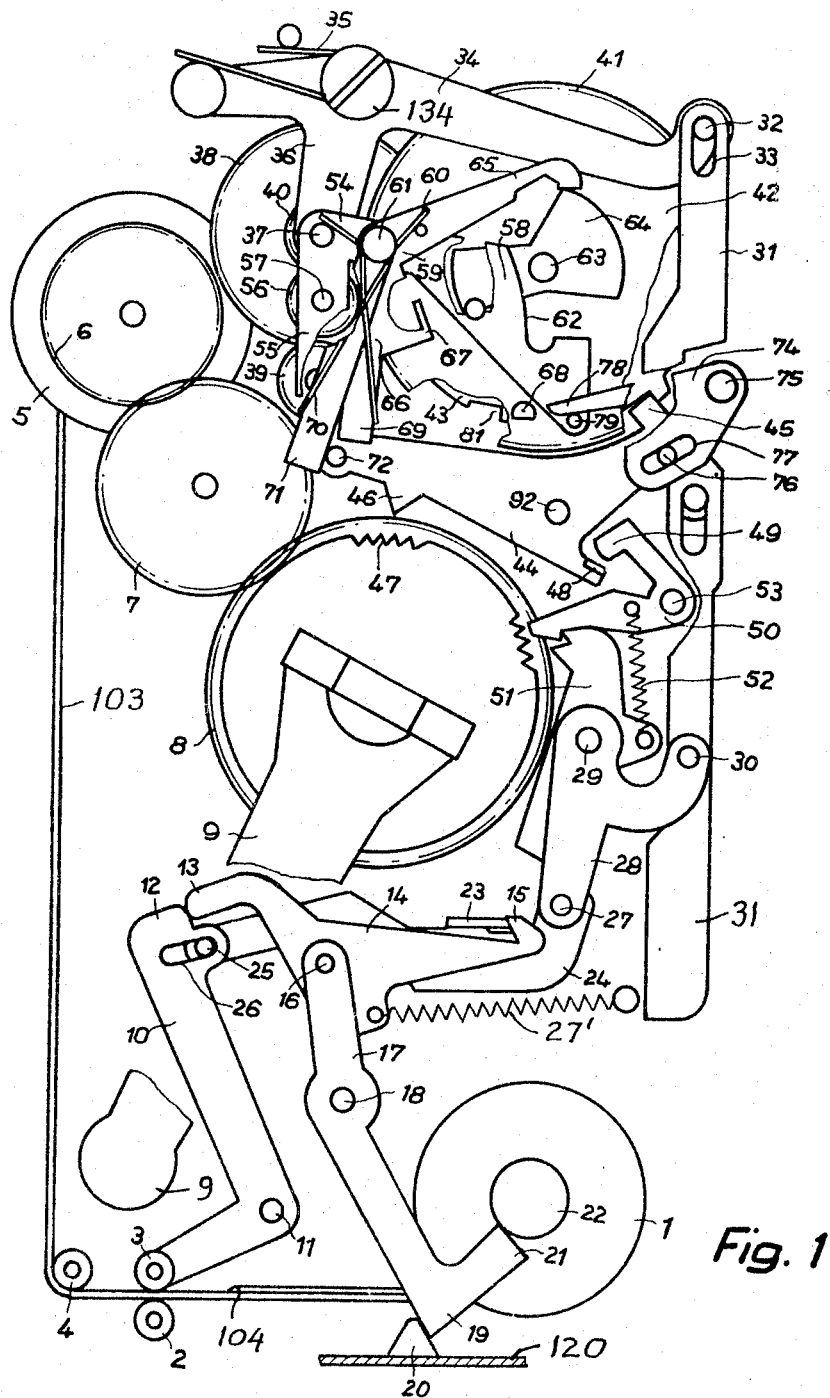
FIG. 1 is a somewhat schematic side elevation of winding and counting mechanism according to a preferred embodiment of the present invention.

Referring first to FIG. 1, the basic structure is quite similar to that disclosed in the above mentioned Müller Patent 2,148,636. It comprises a film supply spool 1, from which the film travels between two rollers 2 and 3, and over a guide roller 4 to the film take-up spool 5 driven by toothed gears 6 and 7 from the gear wheel 8 of the main film advance member conventiontly turned by a crank partially shown at 9. This corresponds in general to the crank 4 and main gear 6 of Müller patent. The roller 3 is mounted on one arm of a bell-crank lever 10 mounted on a fixed pivot 11. The other end 12 of the bellcrank lever engages one end 13 of a lever 14 the other end 15 of which is hook-shaped as shown, to engage a lug 23 as further described below. The lever 14 is pivoted on a pivot 16 carried by one end of the lever 17 which is pivoted intermediate its ends at 18. The other end 19 of this lever is adapted to engage a projection 20 on the camera back fragmentarily shown at 120, in such manner that when the camera back is closed, the projection 20 will swing the lever 17, 19 in a counterclockwise direction on its pivot 18, bringing the end 21 of the lever against a fixed stop 22, which can conveniently be in the form of one of the trunnions on which the film spool 1 is mounted. The camera back fragmentarily shown at 120 is shown in greater detail at 42 in the above mentioned Müller patent, in which patent the bellcrank lever 23 and the lever 45 correspond in general to bellcrank lever 10 and lever 17–19 of the present application, as will be readily understood by those skilled in the art.

When the camera back 120 is open, the spring 27' can move the lever 14 rightwardly from the position shown in FIG. 1, and also can turn it counterclockwise on its pivot 16, to cause the hook 15 to engage the lug 23 on a link member 24, one end of which has a pin 25 engaged in the slot 26 of the lever 10. The other end of the link 24 has a pin 27 connecting it pivotally with a lever 28, pivoted on the fixed pivot 29 and pivotally connected at 30 to the approximately vertical link or slide member 31. The upper end of the link 31 has a slot 33 receiving a pin 32 on the lever 34 which is pivoted on a fixed pivot 134 and is urged in a counterclockwise direction on such pivot by the spring 35. One arm 36 of this lever 34 carries a pivot 37 on which is rotatably mounted the large gear wheel 38 and the small pinion 40. The large gear 38 meshes with the pinion 39 on the shaft of the film metering wheel, which metering wheel is not shown here but is well known in the art and is shown at 11 in the above mentioned Müller patent. The film metering wheel resiliently engages the film (or the paper backing, when one is present) which is being wound up on the take-up spool 5, being rotated by the winding of the film and causing rotation of the gear 38 which, in turn, rotates the pinion 40 so as to rotate the metering gear 41 of the counter disk 42 and the associated notched disk 43. As well understood in the art, a light return spring (not shown) tends to turn the parts 41, 42, 43 in a clockwise direction to a predetermined initial starting position determined by engagement of a radial arm 143 on the disk 43, with an arm 45 on the locking lever 44 which is pivoted at 92 and which is urged by a spring in a counterclockwise direction on the pivot 92, so that when a notch in the periphery of the notched disk 43 comes opposite the arm 45, the lever 44 can swing in a counterclockwise direction sufficiently to bring its locking tooth 46 into engagement with the teeth 47 of a disk or wheel rotating with the crank 9, to stop the rotation thereof.

The parts thus far described operate in a manner quite similar to the above mentioned Müller patent, as will be readily understood by those skilled in this art. When a fresh supply of film has been inserted in the camera and threaded onto the take-up spool 5, and when the camera back 120 is closed, the projection 20 on the back will shift the lever 17, 19 in a counterclockwise direction, carrying the lever 14 leftwardly, so that the hook 15 thereof carries the link 24 leftwardly. This will cause the lever 28 to turn in a clockwise direction on its pivot 29, pulling the link 31 downwardly, thereby swinging the lever 34 in a clockwise direction on its pivot 134, against the force of the spring 35. This will move the pinion 40 leftwardly out of mesh with the gear teeth 41, so that the return spring of the metering mechanism 41, 42, 43 will now return this mechanism in a clockwise direction to its initial starting position, where the numeral "0" will appear through the sight window shown schematically at 100. The crank 9 can be turned clockwise to feed the film. At first, there will be no rotation of the metering parts 41, 42, 43 because the pinion 40 is still out of mesh with the gear teeth 41.

As the paper leader 103 advances, the advancing edge 104 of the actual film itself will reach the feeler roller 3. Since the thickness of the film strip plus the paper backer at this point is thicker than the thickness of the paper alone, the added thickness will displace the roller 3, turning the lever 10 in a clockwise direction and thus causing the end 12 of the lever to press against the end 13 of the lever 14, swinging the latter in a clockwise direction on its pivot 16 which at this time will be stationary because the lever 17, 19 is tightly held between the projection 20 and the fixed member 22. The swinging of the lever 14 will release the hook 15 from the lug 23, so that the force of the spring 35 can now turn the lever 34 in a counterclockwise direction, pulling upwardly on the link 31. This enables the pinion 40 to come into meshing engagement with the gear teeth on the metering gear 41, so this gear now begins to turn as a result of the rotation of the pinion 40 caused by rotation of the pinion 39 because of the above mentioned metering wheel riding on and being turned by the paper leader strip being wound onto the take-up spool 5. When feeding has been continued enough to bring the first picture area of the film 104 into proper exposure position, the metering member 41, 42, 43 will have been turned far enough to bring the first notch of the member 43 opposite the arm 45 of the lever 44, allowing the latter to turn counterclockwise so as to drop the tooth 46 thereof into the teeth 47 of the rotary feeding member, stopping rotation. At the same time, the portion 48 on the lever 44 raises the arm 49 of the pawl 50 which is pivoted at 53, against the force of its spring 52, so that the other end of the pawl 50 releases the main locking pawl 51 which, under the influence of the same spring 52, engages the teeth 47. The numeral "1" now appears through the window 100, and the camera is ready for taking the first exposure. Upon the return swing of the crank 9 back to its normal starting position, the tooth 46 is disengaged from the teeth 47 in known manner. At each exposure, the main locking pawl 51 is lifted out of engagement with the teeth 47, and the film winding crank can be actuated for further feeding of the film. All of this is well understood by those skilled in the art.

After each successive exposure, further winding of the crank 9 turns the gears 38 and 40 so that the latter, meshing with the teeth 41 on the counter disk 42, turns the counter disk one further step. When the normal maximum number of exposures, for example, 12 exposures, is reached, a cap 90 in the teeth 41 of the disk 42 comes opposite the gear 40, so that the gears 38 and 40 can now turn without causing further rotation of the disk 42. In this position, the locking means 45, 46 can no longer engage, so now the trailer strip of the film can be wound on to the take-up spool without further obstruction. This is the normal operation.

However, if the camera is being used with double length film having, for example, 24 exposures instead of 12 exposures (as is possible if the paper backing of the film is omitted, and only a paper leader strip and paper trailer strip are used) then the film winding lock should not become inoperative after the 12th exposure, but instead, it should remain operative until after the 24th exposure, and the counter mechanism should continue to be operated after the 12th exposure until the 24th exposure is reached. According to the present invention, this is accomplished by the structure which will now be described.

Figure 7:
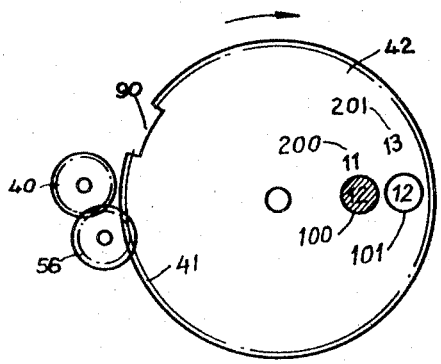
FIG. 7 is a similar view at the completion of shifting of the gearing ready for counting of additional exposures on the same film.

Pivotally mounted on the same shaft or stud 37 which forms the axle for the gears 38 and 40, there is a two-armed lever indicated in general at 54, the separate arms thereof being designated by the numerals 55 and 58. The first arm 55 carries a pivot 57 on which a gear 56 is mounted, of the same size as the gear 40 and constantly meshing therewith. As will be further explained below, the gear 56 is out of mesh with the gear teeth 41 on the counter disk 42 during the feeding of the first part of the film, in the position shown for example in FIG. 5, but during the feeding of the second half of the film, the gear 56 is brought into mesh with the gear teeth 41 and the gear 40 is unmeshed from the gear teeth 41, as shown in FIG. 7, so that the driving direction of the counter-disk 42 will be reversed.

The second arm 58 of the lever 54 is provided with an inclined cam edge 62 for cooperation with a suitable fixed abutment such as the shaft 63 of the cam disk 64. This shaft 63 and cam 64 may be rotated to different positions by any suitable external handle of conventional form (not shown) manually accessible at the outside of the camera, for purposes further described below. Although the shaft 63 may rotate for this purpose, it acts as a fixed abutment so far as the inclined cam surface 62 is concerned.

There is another two-armed lever 59 pivoted at 61 on the second arm 58 of the two-armed lever 54. A spring 60 tends to turn the lever 59 clockwise on the pivot 61. The first arm 65 of the lever 59 has an end which cooperates with the cam 64 previously mentioned, which is settable to one or another position by means of an external handle. The second arm 66 of the lever 59 has a bent-over 67 which projects into the plane of a pin 68 fixed on the counterdisk 42. The other two-armed lever 54 also has, extending from its arm 55, a bent-over portion 73 which likewise extends into the plane of the pin 68.

The above mentioned arm 66 of the two-armed lever 59 has, in addition to the bent-over lug 67, an extension 69 extending in a direction approximately radially from the pivot 61. Overlying the extension 69 and pivoted on the same pivot 61, is a latch member 71 adapted under certain circumstances to cooperate with a pin 72 on the locking lever 44. A cross spring 70 tends to keep the latch 71 in overlying alinement with the extension 69.

A shift arm 74 is mounted to turn on the pivot 75 and has a slot 77 engaged by a pin 76 on the vertical link or slide member 31. A projecting arm 78 on the shift arm 74 lies in the range of the shift pivot 79 arranged at the end of the arm 58 of the two-armed lever 54. When the slide 31 is pulled all the way down, the pin 76 thereon will swing the shift arm 74 to engage the pin 79 to swing the lever arm 58 downwardly, if it has previously been displaced upwardly from such position.

Figure 8:
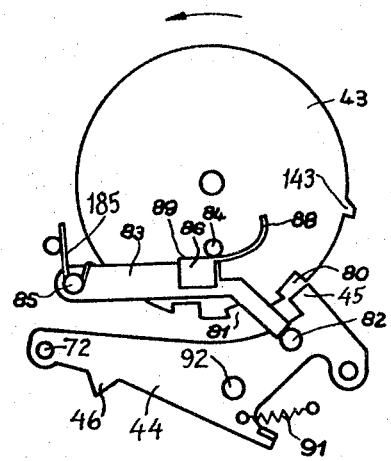
FIG. 8 is a schematic view of part of the winding and counting mechanism, showing the position of the parts of the film winding, lock when winding the film leader strip.
Figure 9:
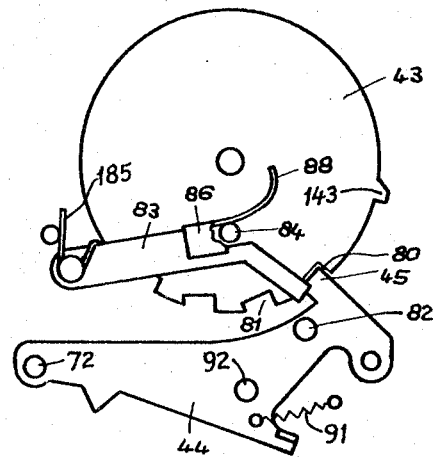
FIG. 9 is a similar view illustrating the parts at the time of locking the last exposure image frame.

In addition to the usual recesses or notches in the periphery of the locking disk 43, well understood in the prior art, this disk 43 is also provided with a special additional recess 80 (see FIGS. 8 and 9) into which the tail 45 of the latch 44 drops upon winding the locking disk 43 back to the last exposure of a double series of exposures, as for example the 24th exposure. But when starting a new series of exposures, the tail 45 should not drop into this special notch 80, but should drop into the first one of the regular series of notches, here indicated at 81. In order to prevent the latch from dropping into the notch 80, the latch member 44 is provided with a pin 82 adapted to bear against a locking lever 83 which is pivoted at 85 and urged by a spring 185 to turn in a clockwise direction. This locking lever 83 cooperates with a cam pin 84 on the counter disk 43. A leaf spring 86 mounted on the lever 83 has a resilient bent tongue 88 projecting from the lever. Near the beginning of the advancing movement of the counter mechanism, the notch 80 comes opposite the tail 45 of the locking member 44, as in FIG. 8, and the spring 91 tries to turn the member 44 counterclockwise on its pivot 92. The pin 82 presses against the lever 83, tending to displace it upwardly, but at this time the lever can not be displaced because the cam pin 84 engages a solid or unyielding part of the lever. But when the next recess 81 comes opposite the tail 45, the pin 84 has meanwhile moved to the resilient tongue 88 of the spring, and so the upward pressure of the pin 82 can displace the lever 83, permitting the tail 45 to drop into the notch 81. During the return movement of the counter mechanism while counting the second half of the film (assuming that double length film is being counted) the cam pin 84, now traveling in the reverse or clockwise direction, comes under the resilient spring end 88 and raises the locking lever 83 to the position shown in FIG. 9, out of the way of the pin 82, so that the tail 45 of the locking lever 44 can drop into the special notch 80 to lock the winding mechanism when the film has been positioned ready for the last exposure, as for example the 24th exposure. Then when the last exposure has been taken, and the winding mechanism is released for winding the trailer strip, the disk 43 turns still further in a clockwise direction, carrying the cam pin 84 leftwardly past the left end 89 of the spring 86, so that the lever 83 is released from the pin 84 and can drop down again from the position shown in FIG. 9 to the position shown in FIG. 8 ready for a new series of exposures.

Figure 5:
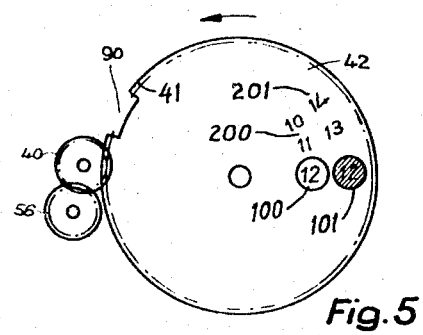
FIG. 5 shows the position of the counter and the transmission gearing after the 12th exposure and before the transmission gearing is shifted to make ready for counting additional exposures on the same film.
Figure 6:
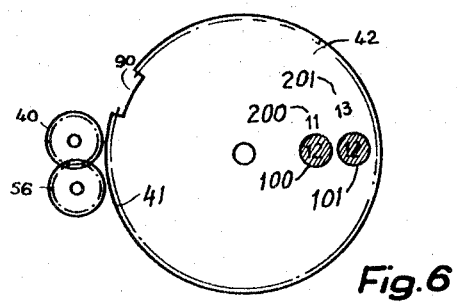
FIG. 6 is a view similar to FIG. 5 showing an intermediate position of the gearing while the shifting of the gearing is in progress.

The counter disk 42, located just inside the side wall of the camera body, in the normal position well understood in the art, has the usual series of film exposure numbers fragmentarily indicated at 200 in FIGS. 5–7, these numbers of the usual series running ordinarily from 1 to 12, and usually with a 0 ahead of the numeral 1. The numerals of this regular series show through the previously mentioned observation window 100. When the mechanism is designed for double length film according to the present invention, there is a second series of numerals fragmentarily shown at 201 and running, for example, from 12 to 24, in the reverse direction to the first series of numerals 200. The numerals of the second series show through a second sight window 101. The numerals and the respective windows are preferably so placed that when the last numeral 12 of the first series is opposite its opposite its window 100, the starting numeral 12 of the second series will also be opposite its window 101. A conventional shutter mechanism of known form, not shown, but indicated schematically by the shading lines in FIGS. 5–7, is used to cover or obscure one or the other of the windows, as seen by comparing FIG. 5 with FIG. 7, and during the actual shifting over from the first series to the second, it may momentarily obstruct both windows as shown in FIG. 6. The shutter, which can be in the form of a simple slide, may be operated manually, but preferably is operated automatically when shifting the transmission gears, preferably being operatively connected to the pin 79 on the lever arm 58, or to some other suitable part of the transmission shift mechanism.

The operation of the invention is as follows: When using the winding and counting mechanism for the normal number of exposures, during a single direction of rotation of the counter mechanism (designed, for example, for 12 exposures in one direction) the cam disks 64 is in the position shown in FIGS. 1 and 2. The mechanism then operates in the normal way well understood in the art in connection especially with a "Rolleiflex" camera. The cam disk 64 holds the arm 65 of the two-armed lever 59 so far in a counterclockwise direction that its other arm 66 and extension 69 lie to the right of the pin 72 on the locking pawl 44, in the position of FIG. 2. The spring 70 holds the latching member 71 likewise in the same position. Thus the pin 72 is not effective upon the latching member 71, and the ear 67 is not in the path of travel of the pin 68 of the counter mechanism. The counter mechanism therefore operates, in the standard manner, and the locking mechanism becomes ineffective in the usual way, at the conclusion of the 12th exposure, so that the crank 9 may be operated to wind the paper trailer strip all the way onto the take-up spool or roll.

Figure 2:
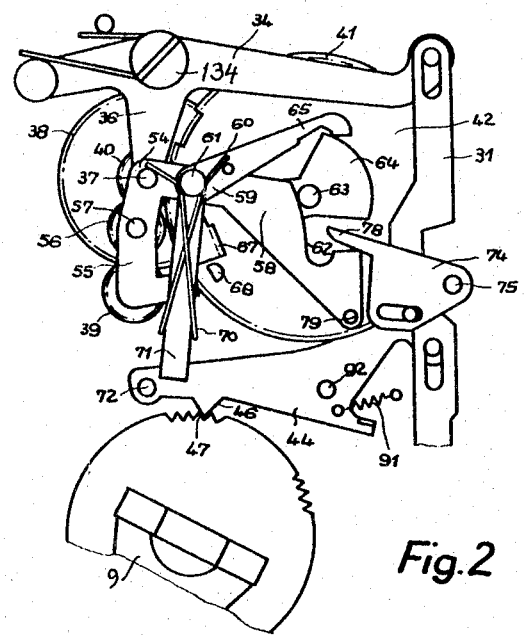
FIG. 2 is a partial view of the same mechanism at the conclusion of the first half of the winding operation, for example, after winding to the 12th exposure position.
Figure 3:
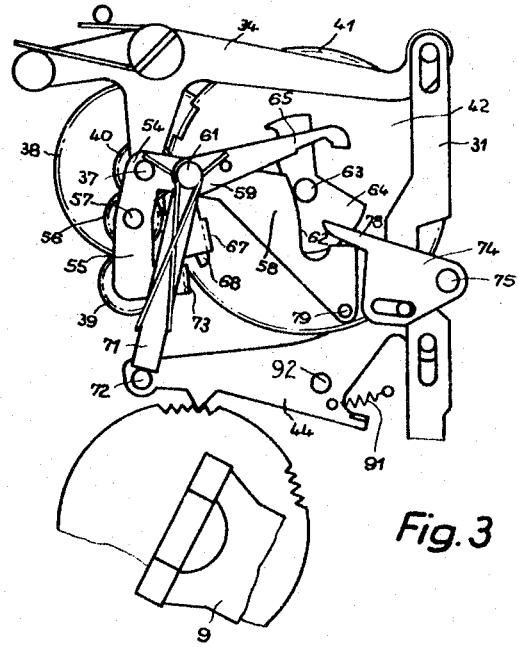
FIG. 3 illustrates the position of the parts upon turning the winding crank back to its initial position after the 12th exposure.
Figure 4:
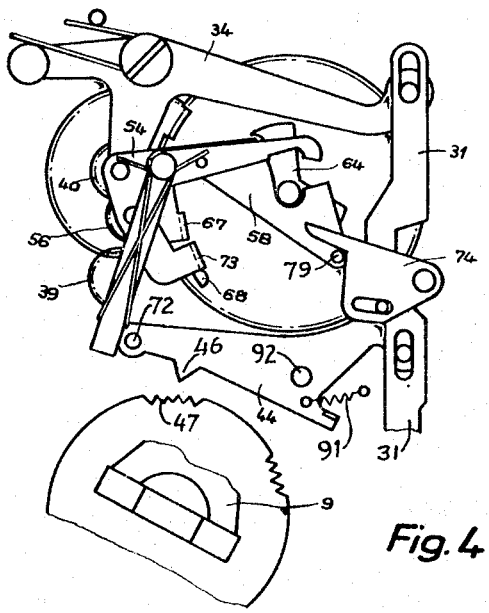
FIG. 4 shows the position of the parts of the winding mechanism after the engagement of the transmission or intermediate gearing.

When using double length film, having 24 exposures, for example, the external handle is operated to turn the control cam 64 from the position shown in FIGS. 1 and 2 to the position shown in FIGS. 3 and 4. In this position, it no longer holds the arm 65 of the two-armed lever 59 in the counterclockwise position thereof, but allows the spring 60 to turn the lever 59 clockwise to the clockwise limit of its travel, somewhat clockwise beyond the position shown in FIG. 3, with the arm 65 against a suitable limiting stop such for example as the pin or axle 63. In this position, the extension 69 of the lever 59, and the latch member 71 held in alinement therewith by the spring 70, now lie to the left of the pin 72 but not in the path of travel of this pin as the pin moves upwardly and downwardly during the successive oscillating movements of the locking lever or pawl 44 as successive exposures are made. But at this time, the bent over lug 67 of the two-armed lever 59 is exactly in the line of the path of travel of the pin 68 on the counter disk 42, although the pin does not come around into contact with the lug 67 until the parts are advanced to the position for the 12th exposure.

During the film winding operation in preparation for the 12th exposure, the pin 68 moves against the lug 67 and thereby rotates the two-armed lever 59 slightly in a counterclockwise direction, far enough to bring the extension 69 directly over the pin 72. The member 71 meanwhile remains engaged with the pin 72 at the left thereof, resiliently under the influence of the spring 70, because the pin 72 is raised (to a position like that shown in FIG. 1) while winding the film into position for the 12th exposure. When the position for the 12th exposure is reached and the locking lever 44 drops down to locking position, the spring 70 shifts the member 71 to a position directly overlying the extension 69, therefore bringing it directly over the pin 72 to a position such as shown in FIG. 3. Then when the crank 9 is turned back to its initial starting position, after completion of the forward feeding movement to the 12th exposure position, the reverse movement of the crank raises the locking lever 44 in the familiar conventional way so that the pin 72 moves upwardly directly under the end of the member 71, forcing the member 71 to move upwardly with it.

Thus the power of the upward movement of the locking lever 44, during the reverse movement of the crank 9, is utilized for shifting the transmission gearing from the position for forward driving of the counter mechanism to the position for reverse driving of the counter mechanism. This is accomplished as follows: The upward thrust on the member 71, produced by upward movement of the pin 72, moves the pivot 61 upwardly and thus produces a force tending to swing the two-armed lever 54 counterclockwise on its pivot 37. The arm 58 of the lever 54 is moved upwardly to slide the cam surface 62 thereof along the abutment 63, simultaneously forcing the arm 58 to move bodily leftwardly at the same time that it turns counterclockwise on the pivot 37. As the pivot 37 is carried leftwardly, it swings the lever 34 in a clockwise direction on its pivot 134, but this is permitted because of the pin and slot connection 32, 33 with the vertical slide 31, so the movement can take place without moving the slide 31. As the pivot 37 moves leftwardly, the gear 40 is brought out of engagement with the gear teeth 41, and as this movement is accompanied by counterclockwise swinging of the lever 54, the gear 56 is brought into engagement with the gear teeth 41.

At an intermediate stage of the movement of the parts, both gears 40 and 56 are momentarily out of engagement with the gear teeth 41, in the position shown in FIG. 6. But just before the gear 40 becomes unmeshed from the gear teeth 41, the counterclockwise swinging movement of the lever 54 has proceeded far enough so that the ear 73 thereon engages the pin 68 on the counter disk 42 and prevents the disk from turning back to its initial position under the influence of its restoring spring. Then as the movement continues, the ear 73 moves to a position radially inwardly beyond the pin 68, no longer obstructing movement of the pin, but by this time the gear 56 has become meshed with the gear teeth 41 so that the counter disk does not become reset at this time to its initial position. After the 12th exposure has been made, the crank 9 is operated in the usual way to feed the film once more to the position for the 13th exposure. During this feeding movement, and subsequent feeding movements to the last exposure area on the film, the film metering wheel which rides against the film on the take-up spool will turn the gear 39 in the usual normal way, which will rotate the gears 38 and 40 in the usual way, but since the gear 40 is now out of mesh with the gear teeth on the counter disk 42 and the intermediate gear 56 is in mesh with such gear teeth, the counter disk 42 will now be rotated in the reverse direction at each successive feeding operation of the film. The film frame numbers or exposure numbers of the second scale 201 will now appear through the window 101, the former window 100 now being covered or obscured. The same metering notches in the disk 43 which were used for metering the advance of the film during the first part thereof, will now be used in the reverse direction for metering the extent of feeding of the second half of the film.

During the second half of the film, in order for the notched locking disk 43 to reach the same number of film frame advancing operations as with the forward winding, an additional recess or notch 80 is necessary, as already mentioned above, but the locking lever 44 should not drop into this recess at the beginning of the forward advance of the film. This is prevented by the parts 82–88 already described in connection with FIGS. 8 and 9, and no further description of this operation is necessary here.

Upon the actuation of the winding crank 9 after the last exposure, a recess 90 in the gear teeth 41 of the counter disk 42 comes opposite the intermediate gear 56, so that the counter and film winding mechanism become inoperative and the trailer strip of the film can now be wound onto the take up spool. Upon opening the camera back to remove the exposed film, the spring 27′ shifts the lever 14 so that the hook 15 thereof engages behind the lug 23 on the connecting rod 24. Then on subsequent closing of the camera back, the projection 20 thereon engages the portion 19 of the lever 17 to pull the lever 14 in a leftward direction when viewed as in FIG. 1, pulling the connecting rod 24 leftwardly and thereby, through the lever 28, pulling the slide or link 31 downwardly. This moves the shift arm 74 downwardly by virtue of the pin and slot connection 76, 77, so that the arm 78 thereon, engaging the pin 79 on the two-armed lever 54, pulls this lever back in a clockwise direction on its pivot 37, restoring it to its initial position ready for the beginning of winding of a new film.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:
1. A photographic camera comprising a member adapted to be driven in one direction by advance of film to successive exposure positions, and counter mechanism normally driven by said member in a forward direction through a predetermined number of steps corresponding to different exposure positions of the film, characterized by reversing gear means operatively interposable between said member and said counter mechanism to cause movement of said member in said one direction to drive said counter mechanism in a reverse direction instead of a forward direction.

2. A construction as defined in claim 1, characterized by a control cam on said counter mechanism for rendering said reversing gear means effective.

3. A construction as defined in claim 1, characterized in that said counter mechanism includes a first series of numbers to identify exposures made while said counter mechanism is being driven in a forward direction, a second series of numbers to identify exposures made while said counter mechanism is being driven in a reverse direction, a first window through which successive numbers of said first series may be observed, and a second window through which successive numbers of said second series may be observed.

4. A construction as defined in claim 1, further including a notched disk operatively connected to said counter mechanism to turn therewith during both forward driving and reverse driving thereof, and an intermittent film winding lock controlled by the notches of said notched disk, characterized by the fact that the notches of said disk are effective to control said lock both during the forward driving movement of said counter mechanism and disk and during the reverse driving movement thereof.

5. A construction as defined in claim 4, characterized by the fact that said notched disk has an additional notch effective to actuate said lock for a last film exposure position near the end of reverse driving movement of said counter mechanism and disk, and means for rendering said additional notch ineffective to actuate said lock during forward driving movement of said counter mechanism and disk.

6. A construction as defined in claim 5, in which said lock includes a locking lever having a portion adapted to drop into said additional notch when said additional notch comes opposite said portion during movement of said notched disk in said reverse direction, an arm shiftable from a non-blocking position to a blocking position preventing said locking lever portion from dropping into said additional notch, and means operated by movement of said notched disk for holding said arm in blocking position as said additional notch nears said portion of said locking lever during movement of said notched disk in a forward direction and for holding said arm in non-blocking position as said additional notch nears said portion of said locking lever during movement of said notched disk in a reverse direction.

7. A construction as defined in claim 1, further including a camera back movable between a closed position and an open position, and means activated by movement of said camera back for returning said counter mechanism to an initial starting position.

8. A construction as defined in claim 1, further including a camera back movable between a closed position and an open position, and means activated by movement of said camera back for rendering said reversing gear means ineffective so that said counter mechanism will be driven in a forward direction rather than a reverse direction when it is next driven after said camera back has been opened and closed.

9. A construction as defined in claim 1, wherein said counter mechanism includes a gear and wherein said driven member includes a first pinion and wherein said reversing gear means includes a second pinion, further characterized by a first lever, said first pinion being rotatably mounted on said first lever for bodily movement therewith from a position meshing with said gear to a position unmeshed therewith, a second lever pivotally mounted on said first lever for swinging movement concentric with said first pinion, said second pinion being rotatably mounted on said second lever in constant meshing engagement with said first pinion and in position for bodily movement with said second lever from a position meshing with said gear to a position unmeshed therewith, and means controlled by arrival of said counter mechanism in a position corresponding to the last film exposure to be made during driving of said counter mechanism in a forward direction, for swinging said first lever to unmesh said first pinion from said gear and swinging said second lever to mesh said second pinion with said gear.

10. A construction as defined in claim 9, further including spring means tending to restore said counter mechanism to an initial position, and means for holding said counter mechanism against restoring movement while said levers are being swung to unmesh said first pinion and mesh said second pinion with said gear.

References Cited

UNITED STATES PATENTS 3,073,299   1/1963   Madge _____ 242—71

NORTON ANSHER, *Primary Examiner.*

R. A. SCHROEDER, *Assistant Examiner.*